UNITED STATES PATENT OFFICE.

BRAXTON D. AVIS, JR., OF WALLACE, WEST VIRGINIA.

COLORATION PROCESS.

933,522.  Specification of Letters Patent.  Patented Sept. 7, 1909.

No drawing. Application filed February 4, 1909. Serial No. 476,055.

*To all whom it may concern:*

Be it known that I, BRAXTON D. AVIS, Jr., a citizen of the United States, and a resident of Wallace, in the county of Harrison and State of West Virginia, have invented a new and Improved Coloration Process, of which the following is a full, clear, and exact description.

My invention relates to coloration processes, my more particular purpose being to provide a simple and inexpensive method of producing iridescent tints and colorations upon glass or upon opaque surfaces requiring comparatively little preparation.

I have made the discovery that mercurous nitrate, $Hg_2(NO_3)_2$, if spread over a surface and brought into contact with ammonia vapor, will form or develop curious and grotesque spots having different colors, and also having generally an iridescent appearance highly ornamental and attractive. I have also discovered that the colors in question can be fixed and retained for indefinite lengths of time, as hereinafter described. In addition to the above, I have discovered that the precise manner of applying the mercurous nitrate to the surface to be colored is immaterial, for the reason that the application of the mercurous nitrate may be made in various ways.

I proceed as follows: To one ounce of distilled water I add a few drops of nitric acid and also a few drops of metallic mercury. This is for the purpose of preventing mercuric salts from forming, at a more advanced stage of the process. I add fifty-five grains of mercurous nitrate in powdered form and shake the mixture until the mercurous nitrate is thoroughly dissolved in the saturated water. I then prepare another solution consisting of distilled water and gelatin, in the proportion of twelve parts of distilled water to one part of gelatin. After the gelatin becomes thoroughly softened, I place it in cold water, adding thereto a few drops of nitric acid. This completes the second solution which, for convenience, I designate as a gelatin solution. I next add one part, by weight, of the gelatin solution to two parts of the mercurous nitrate solution, thus forming an emulsion which I next pass through a filter.

A good plan is to apply the emulsion directly to the surface to be treated. If the surface happens to be porous, as is the case with paper, horn, wood and the like, it is desirable to first apply a coating of varnish. If the surface is metallic, a coating of varnish renders it more suitable for the purpose; especially if the metallic surface is readily acted upon by mercurous salts.

The emulsion may be applied by any suitable means, such as a brush, a spray or even by merely pouring a small quantity of the emulsion upon the surface and allowing the superfluous liquid to drain off. The emulsion can even be applied to a surface having the form of an ornamental pattern or design. After the emulsion is applied in any of the various ways above suggested, or otherwise, the surface thus treated is exposed to the action of vapor of ammonia. The proper stage for bringing the surface into contact with the vapor is when the surface is almost dry; that is, if the finger be touched upon it, a faint impression is left. The effect of the ammonia vapor is to cause the surface, treated as above described, to acquire various colorings, and in doing this to attain a general iridescent appearance. The surfaces thus treated appear to be rendered slightly crystalline by the action of the ammonia vapor, and when the surface treated is exposed to a strong light and is moved slightly, the various colors flash rapidly in succession over the surface and seem to undergo changes in appearance. The effect is probably due to an interference phenomenon in which the crystalline character of the surface is related in some way to the various wave lengths of the light employed.

Another way of practicing my invention is to spread upon any suitable surface a coating of gelatin, allowing the same to dry, then applying to this coating a solution of mercurous nitrate, allowing this to dry, and finally exposing the surface thus treated to the action of ammonia vapor. The final result is not materially different from that obtained as above described with reference to the use of the emulsion.

I have found that colors made as above described are well fixed and are permanent. By washing the surface in cold water, the colors are removed and the surface readily bleached.

I do not limit myself to the precise details above enumerated, for the reason that within proper limits my process may be varied, the scope of my invention being commensurate with my claims.

Having thus described my invention, I claim as new and desire to secure by Letters Patent:

1. The method herein described, which consists in placing a thin coating of mercurous nitrate upon a surface, and exposing the surface thus treated to the action of an alkaline vapor.

2. The method herein described, of coloring a surface, which consists in placing upon said surface a thin coating of mercurous nitrate and bringing said surface thus treated into contact with ammonia vapor.

3. The coloration process herein described, which consists in bringing together upon a surface to be treated, mercurous nitrate and ammonia.

4. The method herein described of coloring a surface, which consists in applying varnish to said surface, placing upon said varnish a thin coating of mercurous nitrate and subjecting said coating to the action of ammonia.

In testimony whereof I have signed my name to this specification in the presence of two subscribing witnesses.

BRAXTON D. AVIS, Jr.

Witnesses:
G. H. FLEEGER,
EDGAR BELL.